Nov. 12, 1929.                J. R. GRUBE ET AL                1,735,752
                            SLACK ADJUSTER FOR BRAKES
                               Filed March 24, 1927
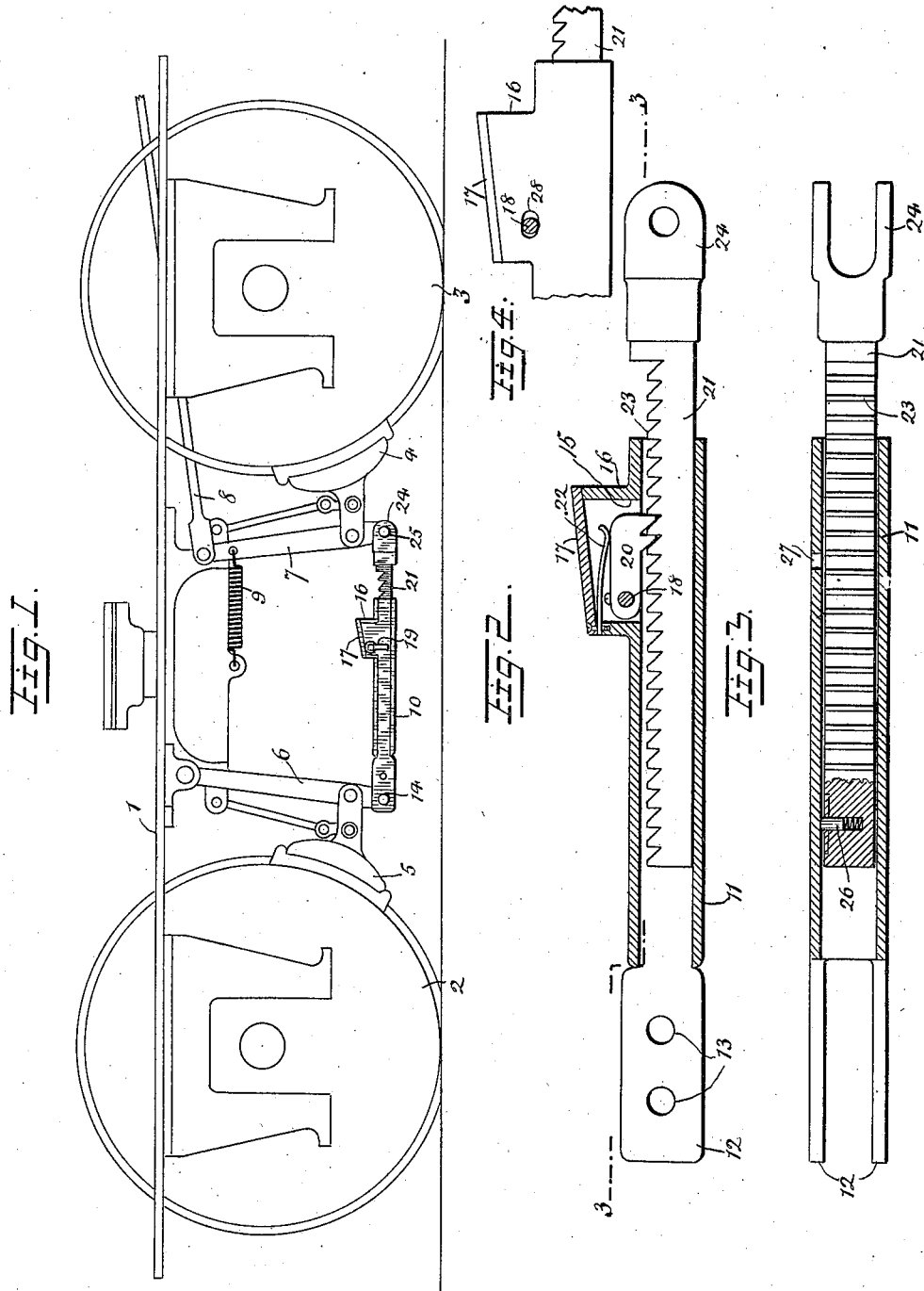
WITNESSES
INVENTOR
J. R. Grube and
L. Munsch
BY
ATTORNEY Patented Nov. 12, 1929

1,735,752

UNITED STATES PATENT OFFICE

JESSE R. GRUBE, OF NORTH BERGEN, AND LOUIS F. MUNSCH, OF SECAUCUS, NEW JERSEY

SLACK ADJUSTER FOR BRAKES

Application filed March 24, 1927. Serial No. 178,111.

This invention relates to a slack take-up for vehicle brakes and has for an object to provide an improved construction which will take up wear on the brake shoes.

Another object is to provide an improved structure which will not readily get out of order, notwithstanding weather conditions.

A further object of the invention is to provide a structure which may be easily manually adjusted.

In the accompanying drawing—

Figure 1 is a fragmentary side view of a car truck with an embodiment of the invention applied thereto.

Figure 2 is an enlarged longitudinal sectional view through the slack take-up shown in Figure 1.

Figure 3 is a sectional view taken through Figure 2 on line 3—3.

Figure 4 is a side view of one end of the casing shown in Figure 2, illustrating the arrangement of slot.

Referring to the accompanying drawing by numerals, 1 indicates a truck of a car and 2 and 3 the wheels of the truck. The invention has been shown on a car truck, but it is designed to be used on locomotives and other vehicles without departing from the spirit of the invention. As indicated in the drawing, the brake shoes 4 and 5 are pivotally mounted on the swinging lever 6 and live lever 7 as usual in trucks of this kind. A pull rod 8 is connected to the upper end of link 7, said rod being actuated in any desired manner. When the brakes are being applied or released, a spring 9 is used for quickly releasing the brake shoes whenever rod 8 is released. The levers 6 and 7 extend below shoes 4 and 5 preferably an equal distance so as to have an equal action on the slack take-up 10. The details of this take-up are shown in detail in Figures 2 and 3 from which it will be seen that the take-up is formed with a casing 11 substantially square in cross section. The casing 11 at one end is provided with a pair of ears 12 formed with a plurality of apertures 13. The ears 12 when in use, straddle the lower end of the lever 6 while a connecting pin 14 is placed in any of the apertures 13 according to the adjustment desired. This pin extends through a suitable aperture in the lever 6 and may be locked in position by a cotter pin or any other desired way. The casing 11 at the end opposite the ears 12 is provided with an aperture 15 and with an enlargement 16. A removable lid 17 acts to close the enlargement 16. This enlargement is designed to receive a pin 18 which extends entirely through the enlargement 16 and carries an operating handle 19 on the outside. A pawl 20 is positioned in the enlargement 16, said pawl being rigidly secured to the pin 18 whereby the pawl may be swung entirely out of engagement with the rack bar 21. Pawl 20 is shown with two teeth but it is evident that one tooth might be used or a greater number than two teeth might be used without departing from the invention. A flat spring 22 acts continually on the pawl 20 to keep it in engagement with the teeth of rack 21. The teeth 23 of rack 21 are shown with one vertical wall, one slanting wall and a flat top section, though other forms of teeth could be used without departing from the invention. If the teeth are one-fourth of an inch across their base, the rack 21 must move at least one-fourth of an inch before a new adjustment takes place. It will be noted that the rack bar 21 is provided with an apertured bifurcated end 24 positioned to straddle the lower end of lever 7. A pin 25 extends through the apertures in the end 24 and through a suitable aperture in the lever 7, said pin being held in place by any suitable means.

In operation, when the parts are in the position shown in Figure 1, the brakes are applied, the spring 9 being distended. As soon as rod 8 is released, spring 9 will quickly swing lever 7 and connected parts until both shoes 4 and 5 are out of operative engagement with the wheels 2 and 3. During the use of the vehicle, the shoes 4 and 5 will become worn. According to the present invention, the parts may be adjusted to take up any appreciable wear on the shoes 4 and 5. For instance, when the shoes have worn to a certain extent, say one-fourth of an inch when the pitch of the teeth 23 is one-fourth of an inch, the levers 6 and 7 may be swung manually so as to cause the rack bar 21 to move in one direction and the casing 11 in the opposite direction until the pawl 20 engages a tooth 23 further back. This will give the desired take-up adjustment. During the operation of the car over a long period of time, all of the teeth 23 are taken up or shifted forward. When the rack bar 21 moves sufficiently, the spring pressed pin 26 snaps into the aperture 27 and then the rack bar cannot move independently of casing 11. When this occurs, new shoes 4 and 5 must be secured and the rack bar 21 moved back manually to substantially the position shown in the drawing.

From Figure 4 it will be observed that the side wall of enlargement 16 is provided with a slot 28 and with a similar slot on the opposite side wall, said slots accommodating the pin 18 so that there is a sliding movement of the pawl 20. This sliding movement is very slight but permits the rear end of the pawl to press against the wall of the enlargement 16 when in the compression stage, instead of against the pin whereby the casing will take the strain directly and not the pin 18. The use of the pin 18 in slot 28 permits a free swinging movement of the pawl and holds the pawl in proper relative position to member 21 to engage the teeth 23. Notwithstanding this fact, the end of the pawl frictionally engages the rear end of the enlargement 16 so that said rear end will take the strain instead of pin 18.

What we claim is:

1. In a slack take-up for wheel brakes, a connecting structure formed with a pair of relatively sliding members, one of said members being a rack, a pawl carried by said other member positioned to be continually engaging the teeth of said rack, said other member having an aperture, and a spring pressed pin carried by said rack bar positioned to snap into said aperture when said sliding members have slid a certain distance in one direction, said pin acting to lock said sliding members against any further relatively sliding movement.

2. In a take-up for wheel brakes, a connecting structure formed with a rack bar, a tubular member telescopically fitting over said rack bar, said tubular member having a hollow enlargement provided with a pair of oppositely positioned elongated slots and a wall acting as an abutment, a shaft extending through said slots, a pawl mounted in said enlargement and rigidly secured to said shaft, said shaft being capable of rocking whereby the pawl may be moved into and out of engagement with said rack bar, and a spring in said enlargement acting on said pawl for causing the pawl to be continually engaging the teeth of said rack bar, said pawl being permitted a sufficient movement to press against said abutment when the pawl is resisting the pressure caused by the compression stage of said rack bar.

JESSE R. GRUBE.
LOUIS F. MUNSCH.